(12) United States Patent
Leach et al.

(10) Patent No.: US 8,735,012 B2
(45) Date of Patent: May 27, 2014

(54) DIRECT OXIDATION FUEL CELL SYSTEM WITH UNIFORM VAPOR DELIVERY OF FUEL

(75) Inventors: David Leach, Torrington, CT (US); Michael L. Chen, Cambridge, MA (US); Charles M. Carlstrom, Jr., Saratoga Springs, NY (US); Constantinos Minas, Slingerlands, NY (US); Keith G. Brown, Clifton Park, NY (US); Robert Miller, Delmar, NY (US); James K. Prueitt, Ballston Lake, NY (US); John E. Meschter, New York, NY (US); Amit Chaugule, Guilderland, NY (US); Russel H. Marvin, Goshen, CT (US); Mark C. Mendrick, Albany, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 1387 days.

(21) Appl. No.: 12/274,472

(22) Filed: Nov. 20, 2008

(65) Prior Publication Data
US 2010/0124677 A1 May 20, 2010

(51) Int. Cl.
  *H01M 8/02* (2006.01)
  *H01M 8/04* (2006.01)
(52) U.S. Cl.
  USPC ........... 429/433; 429/507; 429/400; 429/434; 429/513; 429/514
(58) Field of Classification Search
  CPC .................................. H01M 8/04; H01M 8/02
  USPC .......... 429/433, 573, 400, 507, 434, 513, 514
  See application file for complete search history.

(56) References Cited

U.S. PATENT DOCUMENTS 6,808,837 B2   10/2004   Hirsch
6,811,905 B1   11/2004   Cropley et al.
(Continued)

FOREIGN PATENT DOCUMENTS

| EP | 1501145 A1 | 1/2005 |
| WO | WO-2005/001960 A2 | 1/2005 |
| WO | WO-2006/137935 A2 | 12/2006 |

OTHER PUBLICATIONS

International Search Report for PCT/US2009/006032, International Filing date Nov. 9, 2009, Applicant MTI Microfuel Cells, Inc., mailed Mar. 16, 2010, 12 pages.

(Continued)

*Primary Examiner* — Patrick Ryan
*Assistant Examiner* — Alex Usyatinsky
(74) *Attorney, Agent, or Firm* — Cesari and McKenna, LLP

(57) ABSTRACT

A fuel cell system which includes a fuel distribution structure that uniformly distributes vaporizing fuel to a fuel cell is provided. As the fuel travels in a flow field channel in the fuel distribution structure, it is substantially converted to a vapor by the heat of the fuel cell operation in such a manner that the resulting vapor pressure works to substantially uniformly distribute fuel evenly outwardly across substantially the entire active area of the anode aspect of one or more membrane electrode assemblies in the system, and whereby localized, uneven "hot spots" of fuel at the anode aspects are substantially prevented. A pair of enthalpy exchanger and heat spreader assemblies include a cathode current collector element that also has a heat spreader plate that collects and redirects heat in the fuel cell system, the assembly acting to manage the heat, temperature and condensation in the fuel cell system.

15 Claims, 12 Drawing Sheets

(56) References Cited

U.S. PATENT DOCUMENTS

| | | |
|---|---|---|
| 6,981,877 B2 | 1/2006 | Ren |
| 7,014,953 B2 | 3/2006 | Menjak et al. |
| 7,235,316 B2 | 6/2007 | Acker |
| 7,362,073 B2 | 4/2008 | Lecky |
| 7,407,721 B2 | 8/2008 | Ren |
| 2005/0048346 A1 | 3/2005 | Fannon |
| 2005/0048349 A1 | 3/2005 | Fannon |
| 2005/0053808 A1 | 3/2005 | Chang et al. |
| 2005/0058866 A1 | 3/2005 | Rocke et al. |
| 2005/0170224 A1 | 8/2005 | Ren et al. |
| 2005/0249998 A1 | 11/2005 | Minas |
| 2006/0141308 A1* | 6/2006 | Becerra et al. ............... 429/24 |
| 2006/0216561 A1 | 9/2006 | Chien et al. |
| 2006/0251940 A1* | 11/2006 | Bandhauer et al. ........... 429/26 |
| 2007/0026279 A1 | 2/2007 | Hirsch et al. |
| 2007/0042237 A1 | 2/2007 | Sorkin et al. |
| 2007/0087253 A1 | 4/2007 | Fannon |
| 2007/0092785 A1* | 4/2007 | Eickhoff ..................... 429/44 |
| 2008/0090107 A1 | 4/2008 | Scartozzi |
| 2008/0131753 A1 | 6/2008 | Minas |
| 2008/0220305 A1 | 9/2008 | Carlstrom |

OTHER PUBLICATIONS

U.S. Appl. No. 12/274,521 entitled Compact Spring Loaded Fuel Cell Monopolar Stack filed Nov. 20, 2008 by Contantinos Minas et al.

U.S. Appl. No. 12/274,453 entitled Heat Spreader Assembly for Use With a Direct Oxidation Fuel Cell filed Nov. 20, 2008 by Charles M. Carlstrom, Jr. et al.

U.S. Appl. No. 10/792,024 entitled Fuel Cell With Compliance Layer filed Mar. 3, 2004 by Constantinos Minas et al.

* cited by examiner

DIRECT OXIDATION FUEL CELL SYSTEM WITH UNIFORM VAPOR DELIVERY OF FUEL

CROSS REFERENCE TO RELATED APPLICATIONS

This application is related to commonly owned U.S. Patent Application of Carlstrom, et al., entitled HEAT SPREADER ASSEMBLY FOR USE WITH A DIRECT OXIDATION FUEL CELL SYSTEM, which is being filed on even date herewith and is identified by later assigned U.S. patent application Ser. No. 12/274,453, and which is presently incorporated by reference herein in its entirety, and U.S. Patent Application of Minas, et al., entitled COMPACT SPRING LOADED FUEL CELL MONOPOLAR STACK, which is being filed on even date herewith and is identified by later assigned U.S. patent application Ser. No. 12/274,521, and which is presently incorporated by reference herein in its entirety.

BACKGROUND OF THE INVENTION

1. Field of the Invention

This invention relates generally to direct oxidation fuel cell systems, and more particularly to fuel cells in which an organic fuel in vaporous form is delivered to the anode of the fuel cell.

2. Background Information

Fuel cell power systems that convert an organic fuel such as methanol or ethanol and an oxidant into electricity are generally categorized into two types. In the first type, a fuel reformer is used to convert the organic fuel stream into a fuel stream containing hydrogen gas. The hydrogen gas is fed to the anode of a hydrogen-fueled fuel cell.

The second type is a direct oxidation fuel cell (DOFC) in which the organic fuel is reacted directly at an anode catalyst electrode of a membrane electrode assembly (MEA) of the fuel cell. An example of a direct oxidation fuel cell is the direct methanol fuel cell (DMFC). The half reactions for a DMFC are:

Anode: $CH_3OH + H_2O \rightarrow CO_2 + 6e^- + 6H^+$

Cathode: $6e^- + 6H^+ + \frac{3}{2}O_2 \rightarrow 3H_2O$

Many DMFC systems known in the art are liquid-feed systems that circulate a low-molarity methanol/water fuel solution through an anode flow field adjacent to an anode gas diffusion layer (GDL). Carbon dioxide ($CO_2$) that is generated in the anode reaction exits through the anode flow field with the unused fuel solution where it is separated before the unused fuel solution is recirculated through the anode flow field.

Some liquid-feed DMFC systems operate using substantially 100% methanol and employ an active system to manage water in the fuel cell. Water is needed for the anode half reaction (as noted in the above reaction equations). Additionally, the cathode aspect of the membrane must be kept adequately hydrated, but not saturated or flooded. Thus, active water management systems are employed that include techniques for capturing water generated at the cathode and returning it to the anode. This replaces: (i) water lost to the anode reaction, (ii) water leaving the system through the $CO_2$ vent, or (iii) water crossing over the polymer-electrolyte membrane (PEM) from the anode to the cathode. These active water management systems can become complex, adding costs, as well as size and weight, to a system that should be small and lightweight to satisfy commercial applications.

Furthermore, it has been found that DOFCs operate best when fuel and oxygen are delivered uniformly to an adequately-hydrated MEA. In a liquid-feed system, water is mixed with the fuel, which provides hydration of the PEM. In addition, fuel is provided in concentration levels adequate to evenly feed the full active area of the membrane. Concentration of the fuel can be managed so that the beginning of the flow path is not over concentrated and the end of the flow path is not under concentrated. In such cases, the energy required to distribute the fuel across the MEA active area comes from a liquid pump. But, these systems also require water delivery and/or recirculation mechanisms such as pumps and conduits for recirculating unused fuel and water back to the anode of the fuel cell.

It is also known to provide a direct-injection fuel feed DOFC in which liquid fuel is directly injected into the anode chamber of the fuel cell. In this case, any fuel that escapes unused is not captured and circulated back through the anode chamber. For example, U.S. Pat. No. 6,447,942 describes a direct methanol fuel cell in which liquid fuel is introduced to the anode by capillary action to a porous material that acts as a wick and which stays wetted with fuel. Another example of a direct-injection fuel cell system is commonly owned U.S. Pat. No. 6,981,877 of Ren et al., for a SIMPLIFIED DIRECT-OXIDATION FUEL CELL SYSTEM, which describes a direct-injection fuel feed system that feeds substantially 100% methanol to an anode chamber without active collection or pumping of water produced at the cathode. Other DOFCs provide fuel in evaporated methanol form to the anode. For example, commonly owned United States Published Patent Application No. US2005/0170224 of Ren et al., for a CONTROLLED DIRECT LIQUID INJECTION VAPOR FEED, describes a system in which liquid fuel is injected with a pump into an evaporator pad by a device with many injection ports; in another embodiment a dispersion member is placed between the evaporator pad and the anode GDL to effectively disperse the fuel.

Challenges are presented in such designs that include managing hydraulic and gravitational pressure in various orientations, as well as in providing components that adjust for the concentration of fuel in the evaporation pad being highest at the injection ports, in order to more uniformly distribute the fuel.

Notably, these prior techniques for direct injection of fuel feed in a vapor form each describe the liquid-to-vapor transition happening in close proximity to the anode GDL. In such designs, the fuel is distributed from a single point fuel source generally perpendicular to the active area of the fuel cell. However, because it is difficult to uniformly distribute the vaporous fuel, water can build up in areas where there is a lower concentration of fuel. Prior techniques attempt to mitigate the water problem by providing a dispersion member between an evaporation pad and the anode catalyst, however this still leaves void spaces in which water can collect. It has been found that the fuel diffuses through water droplets at a diffusion rate that is orders of magnitude lower than fuel diffusing through gas such as $CO_2$. Thus, randomly distributed water droplets in the anode chamber void spaces can still result in a spatially non-uniform distribution of fuel to the anode catalyst which reduces performance.

In addition, there is also a temperature dependency that leads to degraded performance. More specifically, as noted, prior designs involve a liquid-to-vapor transition that happens in close proximity to the anode aspect of the MEA. The vapor delivery rate to the anode catalyst in such prior techniques is a function of the vapor pressure of fuel and the porosity of the fuel distribution layers. But the vapor pressure of the fuel is dependent upon the temperature at the area where the evaporation occurs. It has been found that, for a given porosity of layers between the liquid fuel and the anode catalyst, the vapor pressure of the vaporous fuel results in a desired fuel feed rate to the anode catalyst only at a single design point temperature. However, if the temperature in that area of the fuel cell is higher than this single design point temperature, then the vapor pressure is affected and a higher fuel-feed rate occurs. When the temperature is lower than the single design point temperature, then the vapor pressure is such that a lower fuel feed rate results. Thus, the vapor pressure and fuel feed rate are difficult to control due to this temperature dependency.

The temperature dependency can be worsened by the heat of the fuel cell operation itself. As the fuel cell reactions occur, heat can build up which may affect the temperature at the MEA, and cause the cathode to dry out.

Another problem is caused by the heat loss due to vaporization of the fuel acting to cool an area to a temperature that is lower then the membrane and catalyst layers. If the cooling is sufficient, then water generated by the fuel cell reaction at the MEA temperature may have a dew point that is higher than the temperature of the evaporation area of the fuel cell. This can result in condensation of water at the evaporator surface in the anode chamber, thus leading to the problems discussed above regarding build up of water in the active area of the anode.

Furthermore, an uneven distribution of fuel to the active area of the fuel cell, can lead to "hot spots," which are locations on the membrane that have a much higher concentration of fuel than other places on the membrane. These "hot spots" result in uneven reactions at the catalyst face, degradation of the membrane due to high temperatures, and uneven generation of water which can shut down the electrochemical reaction at the localized area.

There remains a need, therefore, for a direct oxidation fuel cell system that has uniform fuel distribution from a single-point fuel injection. There remains a further need for a system in which a vaporous fuel is delivered at a desired vapor pressure in such a manner that the fuel feed rate that is controlled and does not depend upon the cell temperature. There remains yet a further need for a fuel cell system that includes heat and water management features that do not add complexity, weight, and/or size to the fuel cell system.

SUMMARY OF THE INVENTION

The disadvantages of prior techniques are overcome by the present invention in which a direct oxidation fuel cell system includes features for generally uniform delivery of vaporous fuel, as well as heat and water management within the fuel cell. In accordance with one aspect of the invention, a monopolar stack configuration of a fuel cell system contains a pair of membrane electrode assemblies, with each membrane electrode assembly including a polymer electrolyte membrane having a catalyst disposed on each of its major surfaces, and one or more diffusion layers. Each membrane electrode assembly has an anode aspect and a cathode aspect, with an anode current collector disposed adjacent to the anode aspect of each membrane electrode assembly, and a multifunction cathode current collector component as described herein, being disposed adjacent to the cathode aspect of each membrane electrode assembly.

Fuel distribution is provided by a unique fuel distribution structure that is sandwiched between the two membrane electrode assemblies, with the anode aspect of each membrane electrode assembly facing the fuel distribution structure. In an illustrative embodiment, the fuel distribution structure is a generally planar component flow channels formed in the component in a spiral or serpentine or other configuration. Liquid fuel is injected into a common fuel feed port generally laterally to plane of the flow channels of the fuel distribution structure. As the fuel travels in the flow field channels, it is substantially converted to a vapor by the heat of the fuel cell operation. The vaporizing fuel spreads outwardly from opposite faces of the fuel distribution structure towards the anode aspect of the MEAs.

Alternatively, prior to injection in the fuel distribution structure, the fuel can be passed through a component that is in thermal contact with the heat spreader plate where it uses the waste heat of the reaction to convert to a vapor state. Advantageously, in either case, the resulting vapor pressure works to distribute fuel substantially uniformly across each anode aspect, while substantially preventing uneven "hot spots" of fuel.

The fuel cell system may also include one or more fuel permeable diffusion layers disposed on either side of the flow field plate, and a polyvinyliden fluoride (PVDF) layer.

In accordance with another aspect of the invention, an enthalpy exchanger and heat spreader assembly is provided in the fuel cell system to manage the heat and humidification in the system. In an illustrative embodiment, there are two such assemblies, one disposed on either side of the fuel cell system, with each such respective enthalpy exchanger and heat spreader assembly being associated with one of the membrane electrode assemblies. In this embodiment, the heat spreader assembly comprises a copper plate which is coated with a layer of a second material that acts as the enthalpy exchanger cold side element. The fuel cell cathode flow field plate is layered on the opposite side of the heat spreader element. The heat spreader plate distributes heat evenly on the membrane electrode assembly and also maintains a desired amount of heat in the fuel cell. The cathode element which is essentially a flow field, also acts as a cathode current collector. A hot side element is disposed adjacent to the cold side element of the heat spreader assembly. The hot side and the cold side element, both have flow channels and they together make up the enthalpy exchanger.

An enthalpy exchange membrane is located between the cold side element and the hot side element for transferring exhaust heat and water from the fuel cell reactions to incoming ambient air thereby warming and humidifying the air before it enters the fuel cell. Thus, the humidity of the cathode aspect of the membrane electrode assembly is effectively controlled.

A spring assembly includes spring elements that are provided adjacent to each hot side element of the enthalpy exchanger and heat spreader assemblies to add compression and stability to the layers of the fuel cell system.

BRIEF DESCRIPTION OF THE DRAWINGS

The invention description below refers to the accompanying drawings, of which.

DETAILED DESCRIPTION OF AN ILLUSTRATIVE EMBODIMENT

Fuel Delivery

Figure 1:
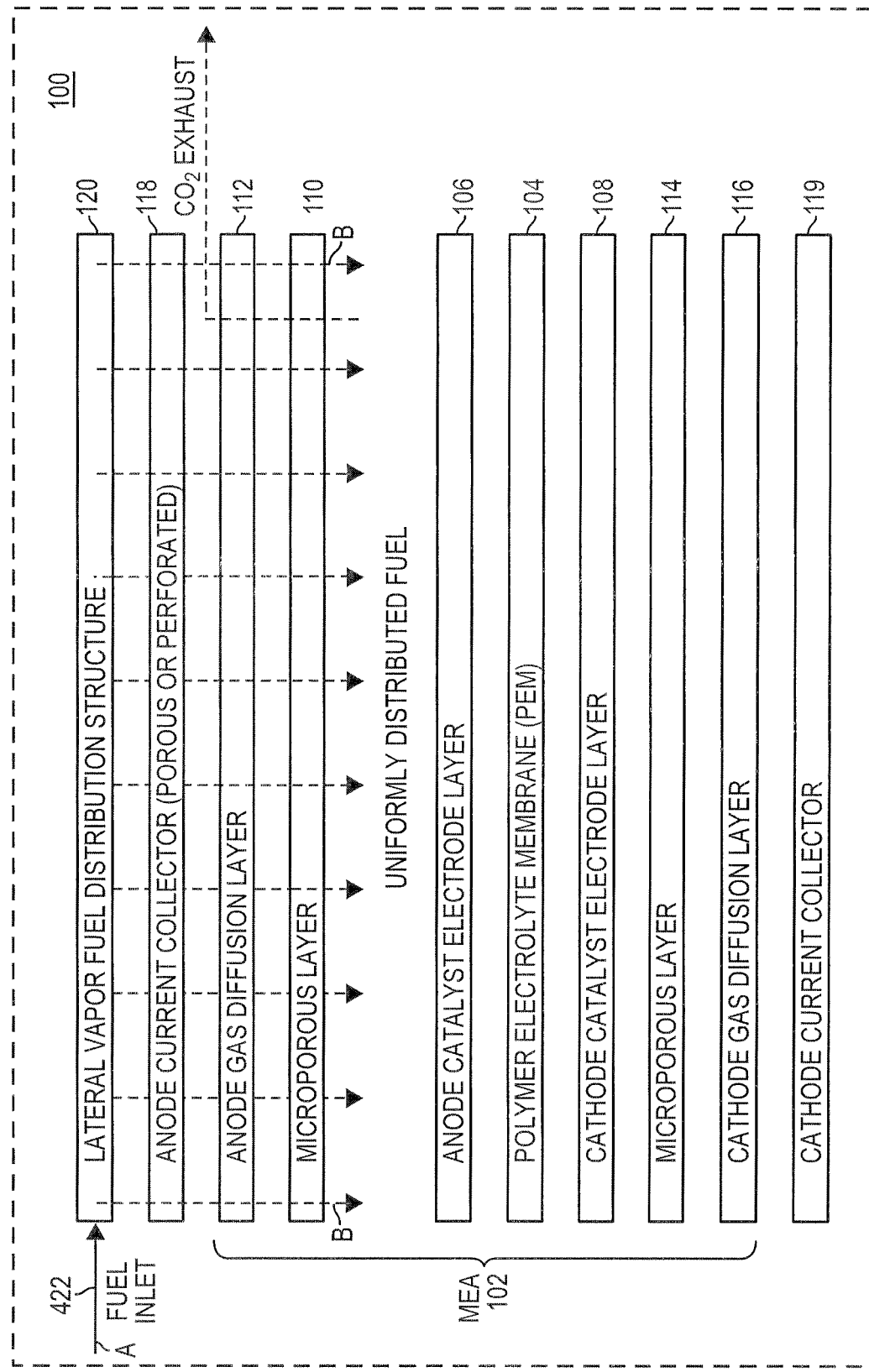
FIG. 1 is a simplified block diagram of a single fuel cell having the fuel distribution structure in accordance with an illustrative embodiment of the present invention.

FIG. 1 depicts an illustrative embodiment of a single fuel cell 100 in accordance with the present invention. The fuel cell 100 includes a membrane electrode assembly (MEA) which is generally designated with reference number 102. The MEA 102 has, as will be understood by those skilled in the art, a polymer electrolyte membrane PEM 104 which has on each of its major surfaces, an anode catalyst electrode layer 106 and a cathode catalyst electrode layer 108, respectively. The anode catalyst electrode layer 106 has associated with it a microporous layer 110 and an anode gas diffusion layer 112. Similarly, the cathode catalyst electrode layer 108 has an associated microporous layer 114 and a cathode gas diffusion layer 116.

An anode current collector 118 is disposed adjacent to anode gas diffusion layer 112 and is a good electrical conductor. Additionally, anode current collector 118 is also permeable to fuel preferably by being either porous or perforated, or a combination of both, to allow fuel to flow to the anode gas diffusion layer 112 as described herein. Similarly, a cathode current collector 119 is disposed adjacent to the cathode gas diffusion layer 116 and it is also a good electrical conductor, and also allows air to flow to the cathode gas diffusion layer. As described further herein, tha cathode current collector of the present invention performs a number of functions within the fuel cell system.

For purposes of clarity of illustration, each component is illustrated as a separate layer in FIG. 1. However, it should be understood that it is within the scope of the invention that embodiments may include a single component that performs the functionality of two or more of the layers illustrated in FIG. 1. In addition, while FIG. 1 depicts the layers separated by spaces, it should be understood that in practice, the layers are compressed together to provide both tight physical contact and thermal coupling between the layers.

In accordance with the present invention, a fuel distribution structure 120 is provided. As will become apparent from the description, in the illustrative embodiment of FIG. 1, a liquid fuel is delivered laterally through a fuel inlet 42, as illustrated by the arrow A. In accordance with the present invention, the fuel is vaporized as it enters and passes through the fuel distribution structure 120. The vaporous fuel spreads across the plane of the fuel distribution structure 120 such that the fuel distribution structure 120 allows the fuel to flow uniformly in the direction of the arrows B through the anode current collector 118, the anode gas diffusion layer 112, the microporous layer 110 to the anode catalyst electrode 106.

Evaporating the fuel, in accordance with the invention, takes advantage of the fact that the fuel has a higher mobility in the gas phase than in the liquid phase, thus making it easier to distribute evenly across the active area of the MEA 102. Moreover, the expansion of the fuel from the liquid phase to the vapor phase adds energy to the fuel due to the latent heat of vaporization. Furthermore, the vapor pressure of the evolving gaseous fuel drives the fuel uniformly through the layers to the active area of the MEA. This substantially reduces the occurrence of uneven fuel distribution that can lead to hot spots and also avoids a build up of water condensation because the vaporization is not occurring in close proximity to the active area on the anode, as had been the case in prior techniques.

Figure 2A:
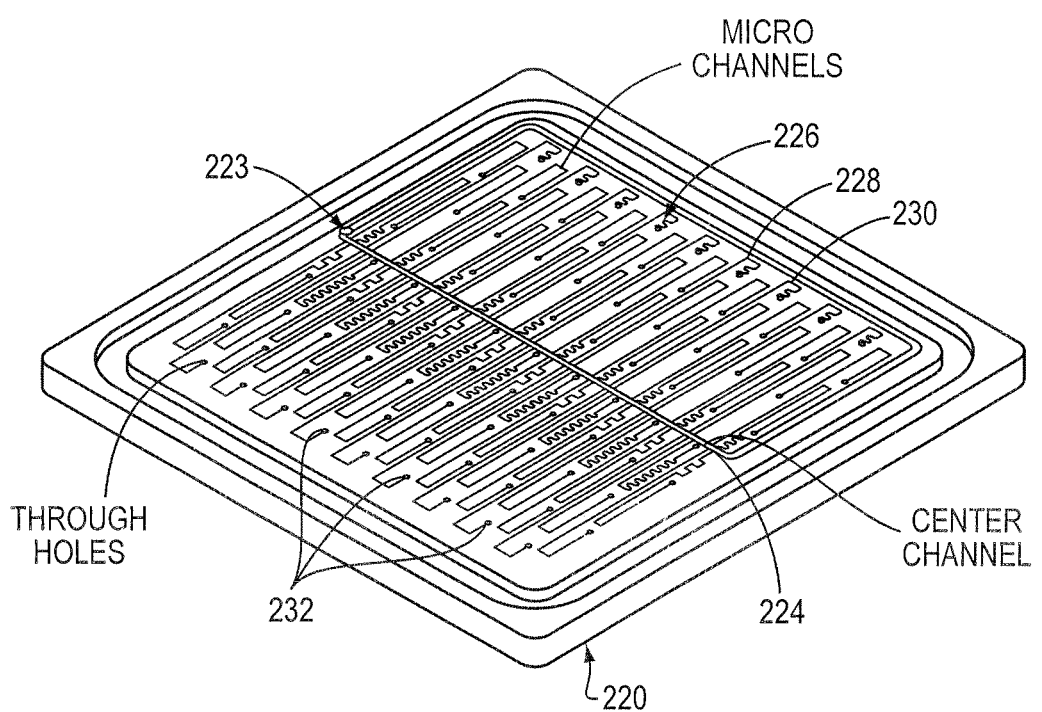
FIG. 2A is an isometric illustration of an illustrative vapor splitter embodiment of the fuel distribution structure of the present invention.

While not limiting to the invention, there are a number of alternative illustrative embodiments of the fuel distribution structure of the present invention that provide uniform fuel distribution. For example, embodiments of the fuel distribution structure 120 of the present invention variously use the functions of pressure-driven fuel flow, diffusion-driven fuel flow, or a combination of the two functionalities. More specifically, FIG. 2A depicts a fuel distribution structure 220 in accordance with the invention that functions as a vapor splitter. The structure 220 has a fuel introduction opening 223 into which fuel is injected. The fuel travels to a center channel, which functions as an input plenum 224. The fuel distribution structure 220 also includes a network 226 of parallel channels 228, 230 that split or spread the fuel from the input plenum 224 to a series of ports 232. The ports 232 are spaced evenly across the fuel distribution structure 220. In operation, liquid fuel is delivered into the opening 223 and travels to the center channel 224. Heat is provided to vaporize the fuel, as will be described in further detail hereinafter. As the fuel vaporizes, the vapor pressure causes it to spread though the network 226 of parallel channels and to pass through the ports 232 in such a manner that the fuel is disbursed evenly across the active area of the fuel cell anode.

Figure 2B:
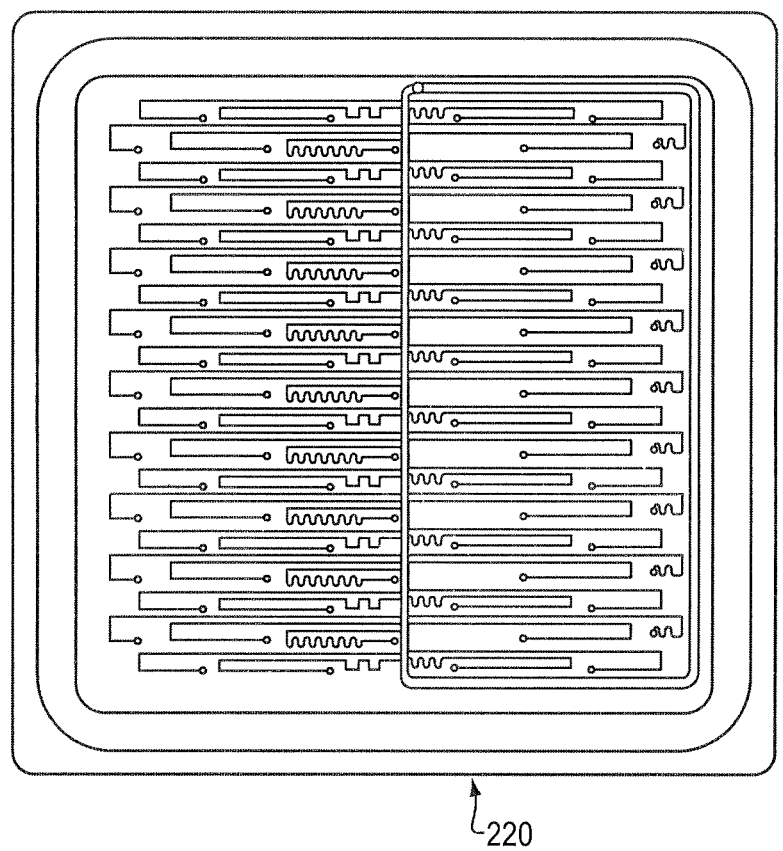
FIG. 2B is a top plan view of the vapor splitter of FIG. 2A.

FIG. 2B illustrates a top plan view of the embodiment of FIG. 2A in which the distribution of the fuel delivery ports can be better appreciated. As will be understood by those skilled in the art, as the fuel cell operates, there are typically some areas where fuel has not yet reached, i.e., anode void spaces, which may be in the anode microporous layer 110, the anode gas diffusion layer 112, or the anode current collector 118 (FIG. 1). These anode void spaces can be filled with $CO_2$ as it is produced. In accordance with the embodiment of the invention illustrated in FIGS. 2A and 2B, to aid the pressure-driven flow, the $CO_2$ is vented to atmosphere; this causes the anode void spaces to be at ambient pressure. Thus, as fuel is introduced and vaporized, the fuel develops a vapor pressure that is higher than ambient pressure areas in the anode void spaces. This results in a pressure driven flow that is achieved from the fuel distribution structure to the fuel cell anode. The fuel is thus quickly and uniformly disbursed and distributed across the active area.

Figure 3:
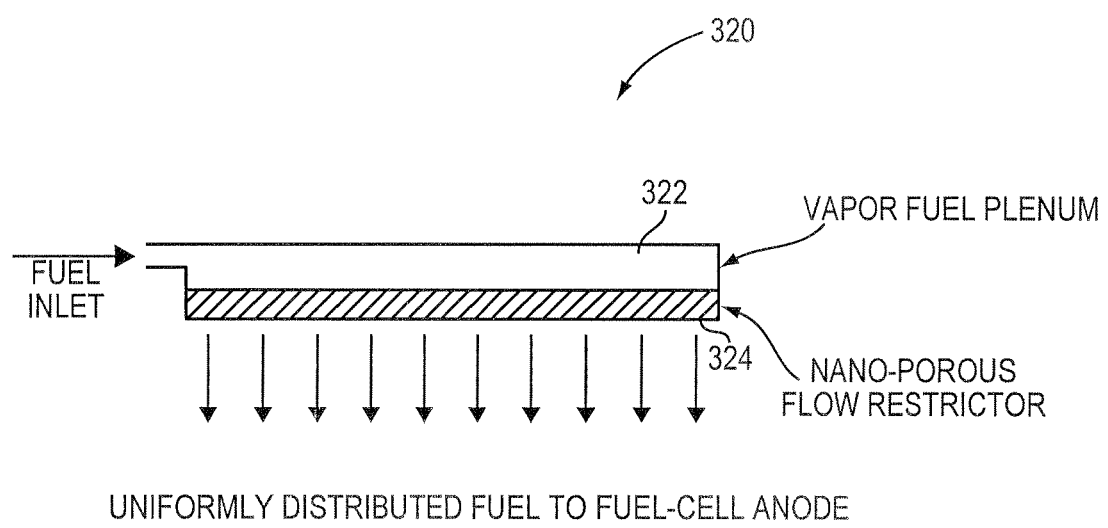
FIG. 3 is a schematic illustration of a portion of the fuel distribution structure of an illustrative embodiment of the present invention that includes a vapor plenum and a nanoporous flow restrictor.

An alternative embodiment is schematically illustrated in FIG. 3, which illustrates a fuel distribution structure 320 having a vapor fuel plenum 322. A liquid fuel is introduced and is vaporized in the vapor fuel plenum 322. A nano-porous layer 324 is placed between the plenum 322 and the fuel cell anode to adjust the flow of vaporous fuel to the anode. More specifically, the nanoporous layer 324 is restrictive, but allows pressure driven flow. Fuel vapor in the plenum 322 disperses through the nano-porous layer 324 to uniformly feed the fuel cell anode. In the embodiment of FIG. 3, the plenum 322 covers substantially the entire active area of the fuel cell (not shown in FIG. 3) and it is comprised of a layer of material that has multiple perforations in an amount in the nano orders of magnitude, for example. The dimensions and material properties of the layer is such that pressure differences within the vapor fuel plenum are small compared to the pressure drop across the nano-porous layer, which acts as a flow restrictor, thus resulting in a uniform fuel flow to the fuel cell anode. The nano-porous flow restrictor 324 also assists in blocking the $CO_2$ that is generated at the anode from flowing back into the incoming vaporous fuel.

Figure 4A:
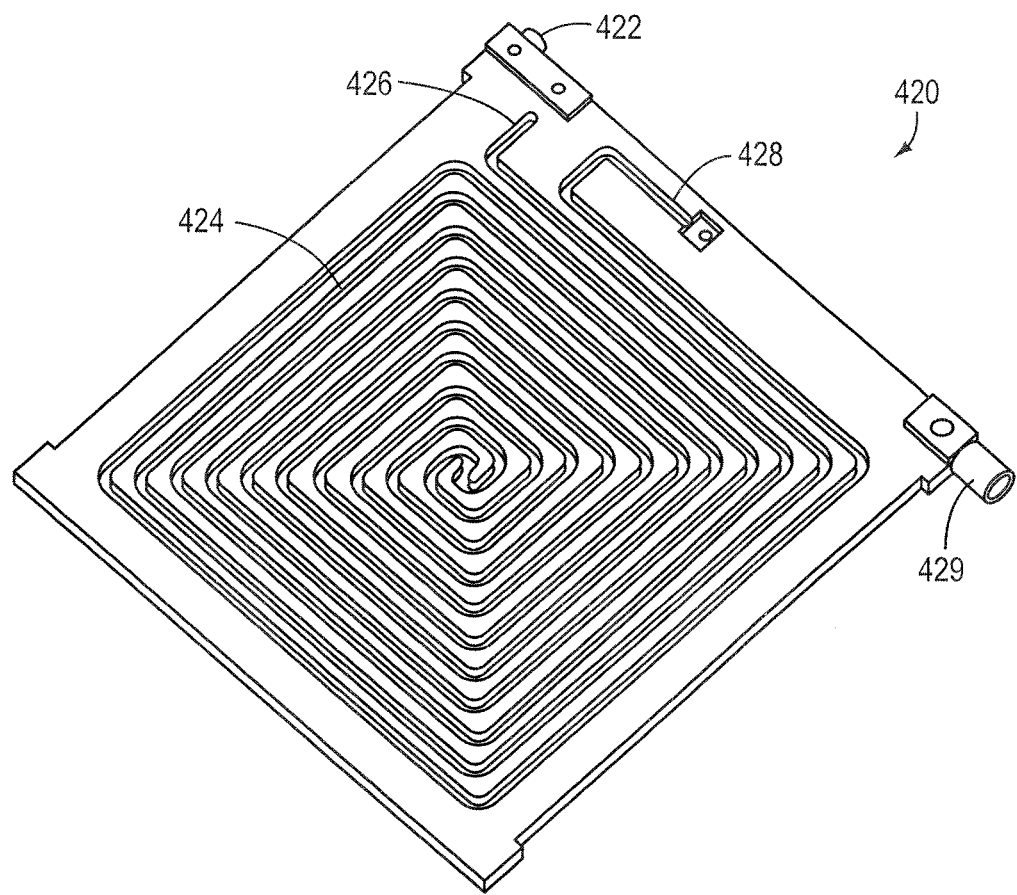
FIG. 4A is an illustrative embodiment of a common feed fuel distribution structure which may be advantageously employed in accordance with a monopolar stack fuel cell system of the present invention.
Figure 4B:
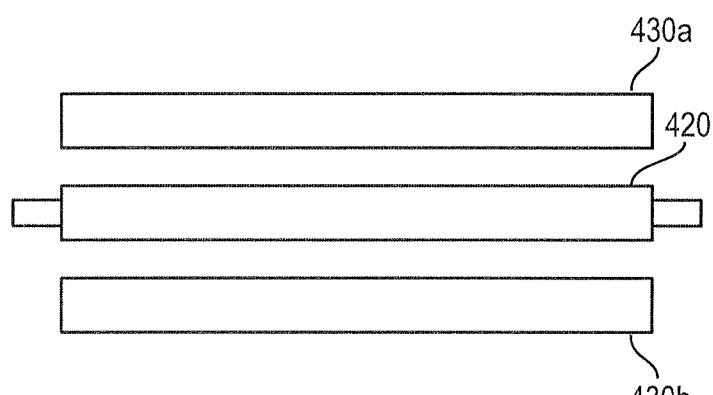
FIG. 4B is a cross section of a portion of a fuel cell system that includes the fuel distribution structure of FIG. 4A and having a fuel permeable diffusion film layer.

FIG. 4A illustrates yet a further alternative embodiment of the fuel distribution structure of the present invention. The fuel distribution structure 420 of FIG. 4A has a fuel inlet 422 which accepts liquid fuel and directs it along generally spiral shaped flow path 424. In accordance with an alternative aspect of the invention, the flow channels may be of a generally serpentine shape of a spiral in-spiral out geometry. As the fuel travels through the flow path, it vaporizes. As illustrated in FIG. 4B, a fuel permeable diffusion film (FPDF) layer 430 is disposed adjacent to the flow fields of the structure 420. The FPDF layer 430 is made of a material that is permeable to gaseous fuel, such as methanol. but yet does not allow pressure driven flow. Thus, in this embodiment, the fuel is delivered using diffusion-driven flow. The flow is thus driven by diffusion from the high concentration vapor gas in the flow channel to a lower concentration vapor gas at the fuel cell anode. An example of a material that is suitable for the FPDF is silicone elastomer. Laminates or composites of other materials may also be used to vary the permeability and surface wettabliltiy of the component. Additionally, the embodiment of FIG. 4A can be modified such that the flow field includes a tube of FPDF material laid in the channel across from the active area of the fuel cell. The vapor fuel is introduced into one end of the tube, and as it flows to the other end, it diffuses through the tube and travels to the anode aspect.

Management of Heat Flow and Water Condensation

Figure 5:
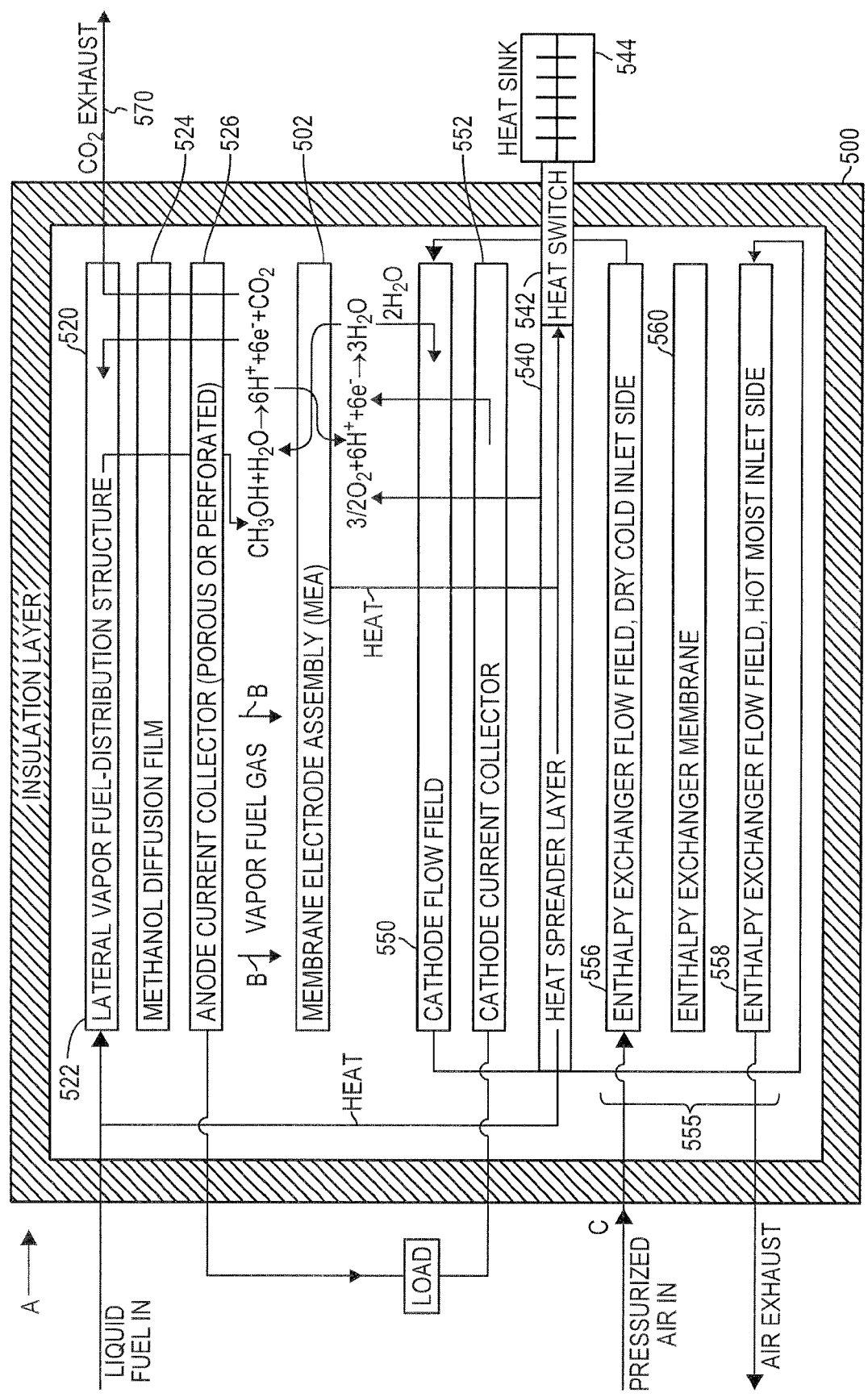
FIG. 5 is a schematic illustration of an illustrative embodiment of a single fuel cell system in accordance with the present invention depicting the primary mass and heat flows.

FIG. 5 illustrates a fuel cell system that incorporates the fuel delivery features achieved by the fuel distribution structure described herein but that also incorporates further aspects of the invention that include components that manage heat and humidification in the fuel cell. The fuel cell 500 of FIG. 5 has an MEA 502 that is similar to MEA 102 (FIG. 1). Liquid fuel is delivered, as illustrated by the arrow A, to the fuel cell 500 via a fuel distribution structure 520, which may be implemented using one of the embodiments described above. As illustrated in FIG. 5, liquid fuel is introduced laterally through a fuel inlet 522 to the fuel distribution structure 520. As the fuel travels through the fuel distribution structure 520, it is vaporized. Alternatively, prior to injection in the fuel distribution structure, the fuel can be passed through a component that is in thermal contact with a heat spreader plate 540, where it uses the waste heat of the reaction to convert to a vapor state. The vaporous fuel then diffuses through a methanol diffusion film (MDF) 524, and is then delivered through a perforated anode current collector 526 in the direction of the arrows B to be uniformly distributed across substantially the entire active area of the anode of MEA 502. There is at least one gaseous effluent release port 570 from the anode aspect, which is in substantially direct gaseous communication with the ambient environment, allowing effective release of gaseous effluent from the fuel cell. The fuel distribution structure 520 is sealed such that fuel entering the fuel inlet port 522 may flow only to the anode aspect or out through the gaseous effluent release port 570.

In accordance with a further aspect of the invention, a heat spreader layer 540 is coupled to a heat switch 542, that is in turn coupled to a heat sink 544. The heat switch 542 can be any suitable heat switch and illustratively is a heat switch as described in commonly owned United States Published Patent Application US 2006-0141308 of Becerra et al., filed on Dec. 23, 2004 for an APPARATUS AND METHOD FOR VARIABLE CONDUCTANCE TEMPERATURE CONTROL, which is presently incorporated by reference in its entirety.

The heat spreader 540 delivers heat as needed to the fuel distribution structure 520 such that the fuel is vaporized as it is introduced into the fuel cell system 500, and as it flows through the fuel distribution structure 520. This heat is the waste heat that is generated by the fuel cell operation. If the fuel cell system has too much heat, a heat conduit removes heat from the system via the heat switch to the heat sink 544. The heat spreader 540 also acts to even out the temperature distribution across the MEA 502.

On the cathode side, the fuel cell system includes, illustratively, a cathode flow field 550 and a cathode current collector 552. In accordance with the invention, an enthalpy exchanger which is generally designated by reference character 555 is also provided. Enthalpy exchanger 555 includes a first element 556 that is a dry, cold side. A second element 558 of the enthalpy exchanger is a hot, inlet side, which includes a flow field into which the air exiting the cathode flow channel is directed. Air is delivered to the cold side as illustrated by the arrow C, preferably under pressure, for example, by an air pump. An enthalpy exchange membrane 560 acts to transfer exhaust heat and water vapor generated at the cathode to the incoming air entering the cold side element 556 of the enthalpy exchanger 555 to assist in maintaining the efficiency of the fuel cell operation and the humidity of the MEA 502.

More specifically, in operation, the enthalpy exchanger 555 receives the incoming oxidant reactant in the form of an inlet air stream into the cold side element 556. A hot and humid exhaust flow stream leading from the cathode of the fuel cell is directed to the hot side element 558 of the enthalpy exchanger and flows in a counter flowing manner with the incoming inlet air stream flowing through the cold side element 556. The hot side element 558 and the cold side element 556 are separated by an enthalpy exchange element 560, which may be a water permeable membrane that resists the flow of gas there through, but collects moisture from the exhaust and allows the moisture to be picked up by the passing inlet stream, thus humidifying the inlet oxidant stream before it enters the cathode. This resists cathode dry out. The effects are further enhanced by a water pushback technique in which water is directed from cathode to anode for the anodic reaction of the fuel cell. Further details of the heat spreader and enthalpy exchanger are provided in the related application, U.S. patent application Ser. No. 12/274,453, which was cited and incorporated by reference herein.

To summarize, the direct oxidation fuel cell system of the present invention includes a fuel distribution structure that is coupled to the anode aspect of the membrane electrode assembly in such a manner that liquid fuel is laterally introduced into a fuel inlet from a fuel source. Vaporizing fuel travels through the fuel distribution structure such that it is uniformly delivered to the anode aspect by vapor pressure-driven flow. In other embodiments, a combination of vapor driven flow and diffusion-driven flow is employed as desired in a particular application of the invention. There is at least one gaseous effluent release port from the anode aspect, which is in substantially direct gaseous communication with the ambient environment, allowing effective release of gaseous effluent from the fuel cell. The fuel distribution structure is sealed such that fuel entering the fuel inlet may flow only to the anode aspect or out through the gaseous effluent release port. The fuel lost out of the gaseous effluent release port is not re-captured. In addition, water management of the fuel cell reaction uses humidified air on the cathode side and water push back via use of a "push back" technique from the microporous layer on the cathode side to force water across the membrane to the anode side of the fuel cell. Water produced at the cathode aspect is not otherwise actively collected or pumped back to the anode aspect. The fuel path between the fuel source and the anode aspect is thermally coupled to the fuel cell such that the fuel cell reaction heat can provide the necessary heat of vaporization to vaporize the fuel.

Monopolar Stack Configuration

Figure 6:
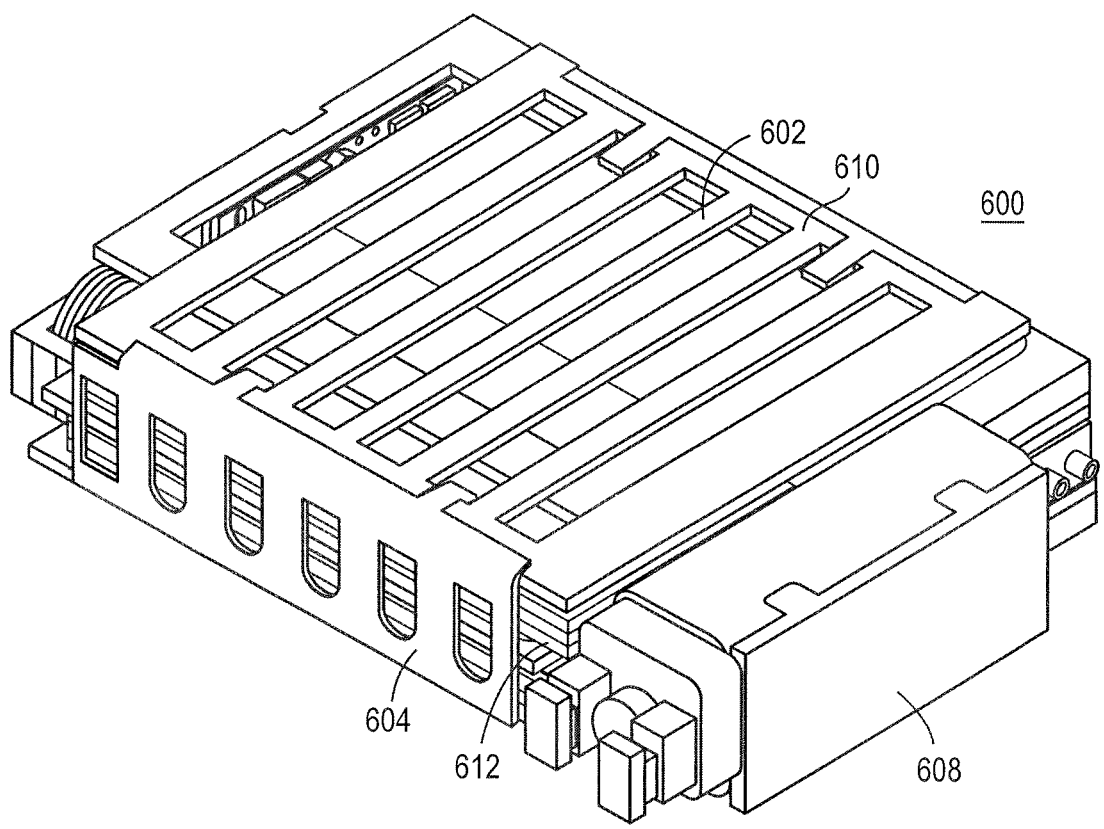
FIG. 6 is an isometric illustration of a monopolar stack configuration of a fuel cell system in accordance with an illustrative embodiment of the present invention.

In accordance with a further aspect of the invention, two fuel cells are arranged in a monopolar stack configuration. FIG. 6 is an isometric illustration of a fuel cell system 600 which is contained within a first compression spring 602, a frame 604, and a second compression spring which is not visible in FIG. 6. A heat switch 608 operates in conjunction with an enthalpy exchanger that has a hot side 610 and a cold side 612.

Figure 7:
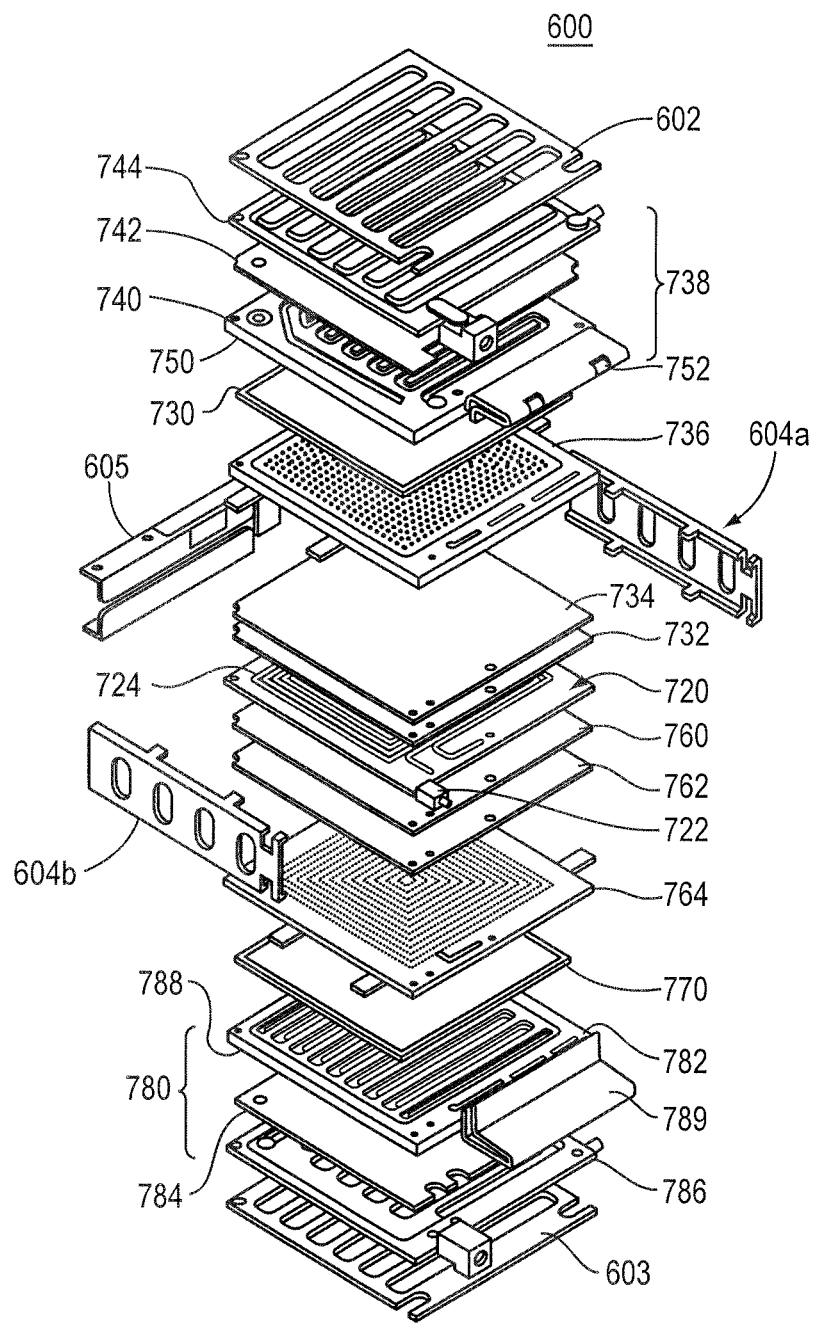
FIG. 7 is an exploded view of the fuel cell system of FIG. 6.

As may be best seen in FIG. 7, which is an exploded view of the fuel cell system of FIG. 6, the fuel cell system 600 is structurally enclosed between compression springs 602 and 603 and clamps 604a and 604b. Electronics and the like are coupled to the fuel cell system at the interface 604c. In accordance with the invention, the fuel cell system of FIG. 7 contains a fuel distribution structure 720, which is a common feed component that is similar to the fuel distribution structure 420 described above with reference to FIG. 4A. The fuel distribution structure 720 provides a two way distribution to supply fuel to two fuel cells that are disposed on opposite sides of the structure. As illustrated in FIG. 7, a first fuel cell has an MEA 730 and a second fuel cell has an MEA 770. The fuel distribution structure 720 is, in the illustrative embodiment, a component having a common feed fuel inlet 722, which is coupled in lateral fluid communication with one or more flow channels 724. Thus the fuel is delivered laterally into the plane of the flow channels and then the fuel is disbursed outwardly as it vaporizes and travels generally perpendicularly in both directions towards each respective MEA.

The first fuel cell (which is the upper fuel cell in the figure, however, it should be understood that the assembly is orientation independent and thus will operate in orientations other that that shown in FIG. 7) includes a methanol diffusion film (MDF) layer 732, which is a type of FPDF (Fuel Permeable Diffusion Film) layer. The fuel cell also includes a layer of polyvinyliden fluoride (PVDF) 734. PVDF is a highly non-reactive, pure thermoplastic fluoropolymer. This optional PVDF layer has a number of advantageous uses in the fuel cell such as to provide a hydrophobic layer between the MDF and the anode current collector to aid in water removal, and may also serve to resist $CO_2$ from undesirably traveling between the two fuel cells.

The first fuel cell has an anode current collector assembly 736 which is adjacent to an anode aspect of the MEA 730. Adjacent to a cathode aspect of the MEA 730 is an enthalpy exchanger and heat management assembly which is generally designated by reference number 738. The enthalpy exchanger and heat management assembly 738 includes a cold side element 740 and hot side element 744. An enthalpy exchange membrane 742 is located between the cold side element 740 and hot side element 744. The lower layer of the cold side component is a heat spreader plate 750 which is coupled to the heat switch tab 752.

Similarly, the second fuel cell includes a second methanol diffusion film (MDF) 760 and a second PVDF layer 762. In addition, the second fuel cell has an anode current collector assembly 764 which is adjacent to the anode aspect of the MEA 770 of that fuel cell. On the cathode side of the second fuel cell, is a second enthalpy exchanger and heat management assembly 780 which has a cold side element 782 and a hot side element 786. An enthalpy exchange membrane 784 is located between the cold side element 782 and hot side element 786. The lower layer of the cold side element 782 is a heat spreader plate 788 to which the heat switch tab 789 is coupled.

In operation, fuel is delivered to common feed fuel inlet 722 of the fuel distribution structure 720. Typically, the fuel is in a liquid form when it is delivered to the fuel inlet 722. The heat spreader elements 750 and 788 collect heat from the fuel cell reaction and thus provide adequate heat for vaporizing the fuel as it travels through flow channels 724. The resulting vapor pressure caused as the fuel vaporizes acts to deliver the fuel to the MDF layers 732 and 760 in a generally uniform and even manner. The MDF layers 732 and 760 assist further to distribute the fuel through each anode current collector 736 and 764, to the respective anode aspects of the MEAs 730 and 770. The $CO_2$ produced in the anode reaction is vented to the ambient, which in turn, causes the pressure in the anode void spaces to be at ambient pressure. Because the vapor pressure of the fuel is higher than the ambient pressure, fuel tends to flow freely to fill such anode void spaces. The vapor pressure of the fuel allows it to pass through these such spaces, further adding to the uniformity of fuel distribution.

Figure 8:
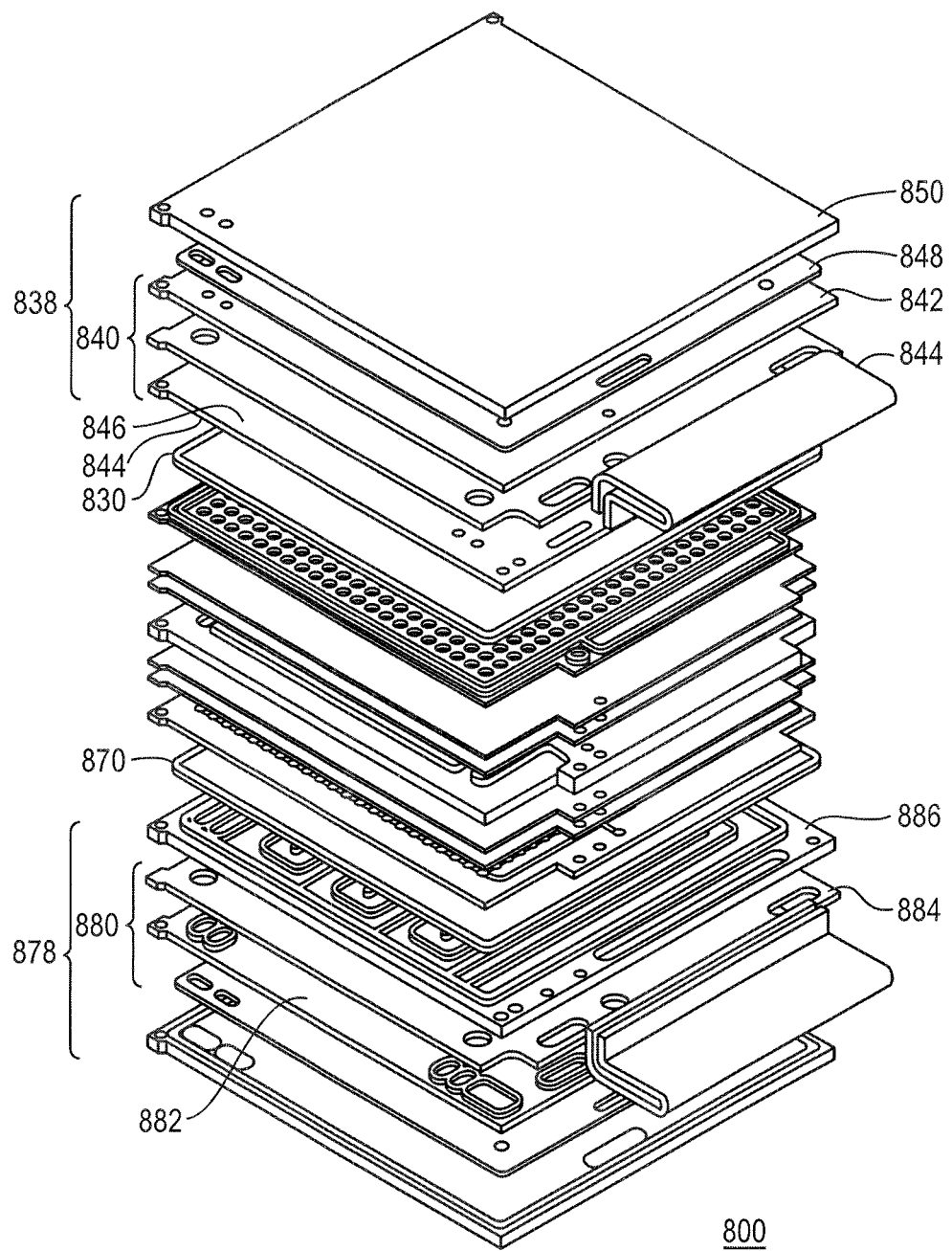
FIG. 8 illustrates another exploded view of the illustrative embodiment of the monopolar stack configuration of the fuel cell system of the present invention, which depicts the enthalpy exchanger and heat spreader assembly in greater detail.

At the cathode side of each fuel cell, pressurized air is delivered to the cathode portion of the fuel cell. More specifically, FIG. 8 illustrates an exploded view of an alternative illustrative embodiment of the monopolar stack configuration of the present invention. More specifically, FIG. 8 depicts a fuel cell system 800 of the present invention in which the enthalpy exchanger and heat spreader assembly can be better appreciated. For example, the fuel cell system 800 has a first MEA 830 and a second MEA 870. A first enthalpy exchanger and heat spreader assembly 838 includes a heat spreader assembly 840 which has a first layer 846 that is an electrically conductive element that also has flow channels formed therein and functions as the cathode flow field. The layer 842 functions as the cold side of the enthalpy exchanger.

The cold side element 842 receives incoming pressurized air and directs the air uniformly towards the cathode aspect of the MEA 830. As is understood by those skilled in the art, oxygen in the air reacts with the hydrogen ions that cross the membrane to form water. The water is typically in water vapor form. A microporous layer (not shown in FIG. 8) acts to push a certain amount of water back across the MEA to the anode side as needed for the anode reaction.

In turn, water vapor that is not pushed back to the anode side (mixed with unreacted air) is directed through the channels of the cathode current collector 846 to the hot side element 850 and then to the cold side element 842, through the enthalpy exchange membrane 848 that is disposed adjacent to the cold side element 842. The enthalpy exchange membrane 848 passes exhaust heat and water vapor to the incoming pressurized air that is directed by the cold side element 842. This allows the incoming air to be humidified, thereby avoiding cathode dry out. In accordance with another aspect of the invention, the flow from the anode exhaust is sent back into the enthalpy exchanger so that the water from the anode further humidifies the incoming air stream.

A heat spreader layer 844 is a layer that is the bottom layer of the cathode current collector component 846. The heat spreader layer 844 is a thermally conductive layer such as copper, that collects heat in the fuel cell system in order to provide the heat to vaporize the fuel, and to maintain an even temperature in the MEA 830. Cathode flow field channels are formed in one side of the cold side element 842. This side of the cathode cold side element is substantially comprised of a bulk composite material that acts to uniformly distribute air across the cathode aspect of the MEA 830 and also transfers current to the heat spreader which also acts as the current collector.

Similarly, the second fuel cell has MEA 870 and an enthalpy exchanger and heat spreader assembly 878 that includes a heat spreader assembly 880. The heat spreader assembly 880 has a first layer 882 that is an electrically conductive element. The layer 882 also acts as the cold side element of the enthalpy exchanger. A heat spreader layer 884 is a thermally conductive material such as copper that collects and directs heat in the fuel cell system in order to provide the heat to vaporize the fuel, and to maintain an even temperature in the MEA 870. A cathode flow field layer 886, which is substantially comprised of a bulk composite material, acts to uniformly distribute air across the cathode aspect of the MEA 830.

It should be understood that the cathode current collector element of the present invention performs a number of functions within the fuel cell system. It acts as a current collector for the electricity generated by the fuel cell, and it acts as a flow field plate for the air and water vapor for the cold side of the enthalpy exchanger. The internal layer of the cathode current collector is the heat spreader layer. The lower layer is the cathode flow field plate which distributes the air evenly across the cathode aspect of the MEA. The heat spreader plate also provides compression for stabilization and integrity of the fuel cell system. With many functions being performed by a single component, this further reduces the number of components required in the fuel cell system, thereby contributing to the smaller form factor, and simplification of the manufacturing process.

Figure 9:
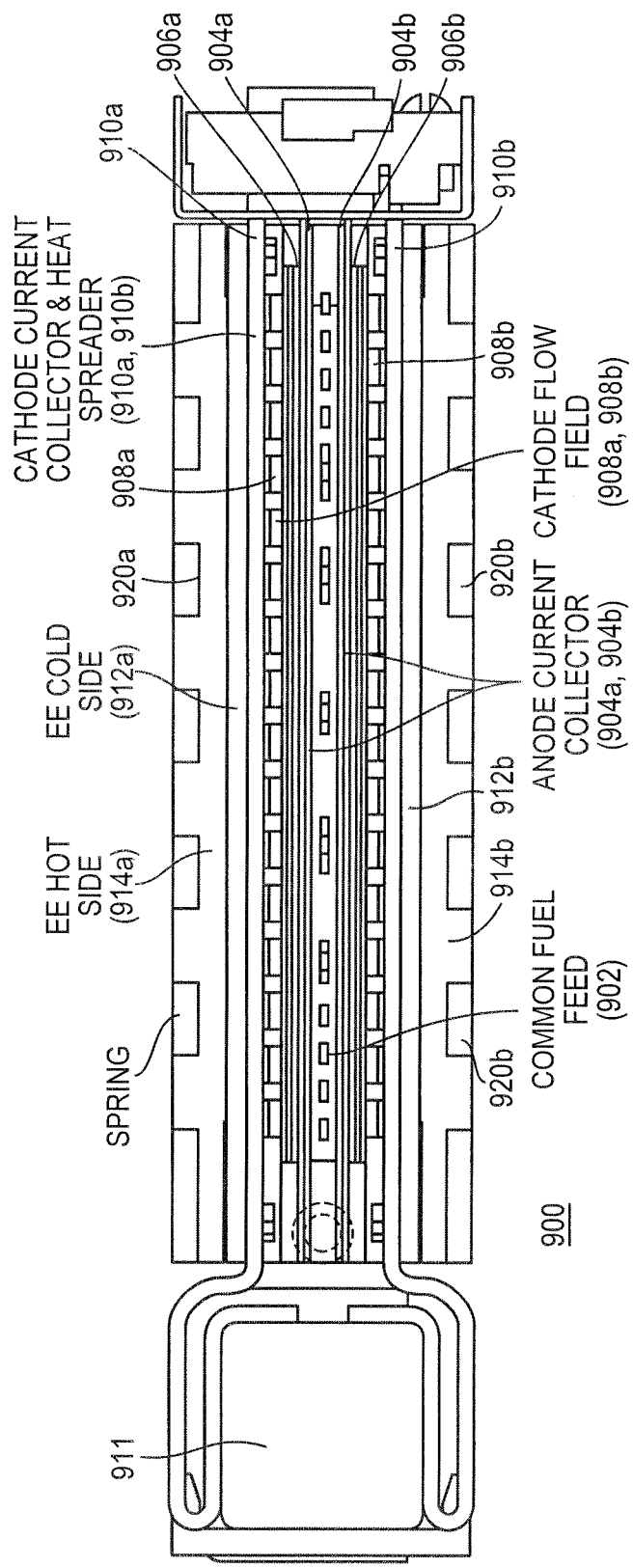
FIG. 9 is a side view of an illustrative embodiment of the fuel cell system of the present invention depicting the fuel cell system in greater detail.

FIG. 9 is a side view of an illustrative embodiment of the fuel cell system of the present invention. The fuel cell system 900 has a common feed fuel distribution structure 902 as described herein. The fuel is distributed through a pair of oppposingly disposed anode current collectors 904a and 904b, and passes to the anode aspects of MEAs 906a and 906b. Air is provided to the cathode aspects of each MEA via cathode flow fields 908a and 908b. The enthalpy exchanger and heat spreader assemblies include heat spreader layers 910a and 910b. The cathode current collectors 910a and 910b are coupled to heat switch 911. The heat switch 911 includes an activation member that responds to temperature changes. It is designed such that when a particular desired temperature is reached, the switch causes the heat spreader layer of components 910a and 910b to come in contact with the other layers to direct heat in predetermined directions in the fuel cell system.

Additionally, the enthalpy exchanger and heat spreader assemblies also include the cold side elements 912a and 912b and hot side elements 914a and 914b. The enthalpy exchange membranes that are disposed between the respective cold and hot side elements are not visible in FIG. 9. Springs elements 920a and 920b provide compression and stablility to the fuel cell system 900.

As noted, further details of the functionality and composition of each layer of the enthalpy exchanger and heat spreader assembly may be found in the related application that was incorporated herein, U.S. patent application Ser. No. 12/274, 453. Further details regarding the spring elements and the functions of the heat spreader plate acting as a compression plate are provided in the above incorporated patent application, U.S. patent application Ser. No. 12/274,521.

Figure 10:
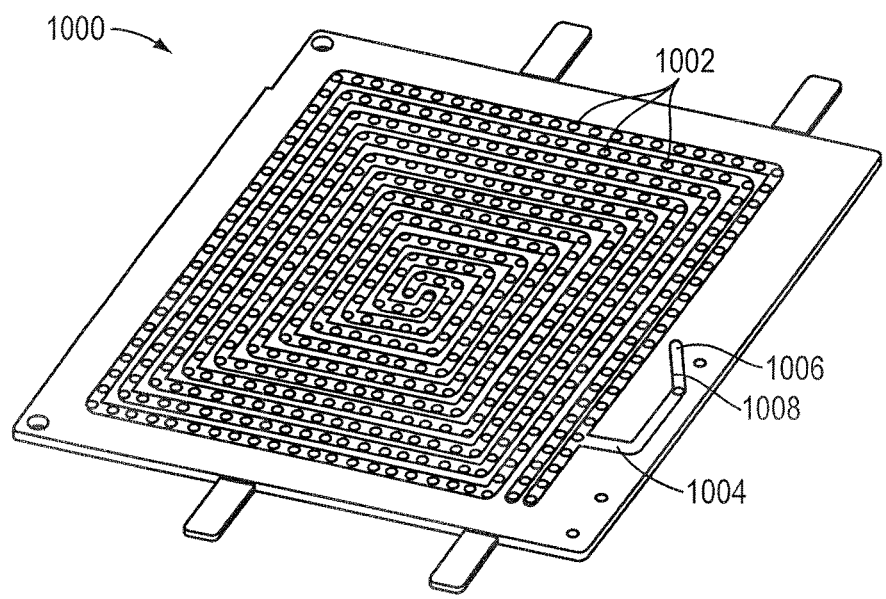
FIG. 10 is a top plan view of an anode current collector and $CO_2$ removal element in accordance with the present invention.

Another reactant that is to be managed within the fuel cell system is carbon dioxide. As is understood by those skilled in the art, carbon dioxide is produced in the anode half reaction when methanol reacts with water to form hydrogen ions that cross the membrane, electrons that are conducted by the anode current collector, and carbon dioxide. The $CO_2$ is, in accordance with one aspect of the invention, released to the ambient environment. In order to effect such release, the fuel cell system may contain, in accordance with the invention, an anode current collector that also has features that improve carbon dioxide removal. Referring to FIG. 10, an anode current collector 1000 has features allowing it to also function as a $CO_2$ release element. The element 1000 has a plurality of small pores 1002 that allow $CO_2$ to collect adjacent to the element 1000 and pass through a $CO_2$ exhaust channel 1004 that leads to the ambient environment. Thus, the $CO_2$ is at ambient pressure and thereby does not impede the flow of fuel vapor to the anode aspect of the MEA.

Figure 11:
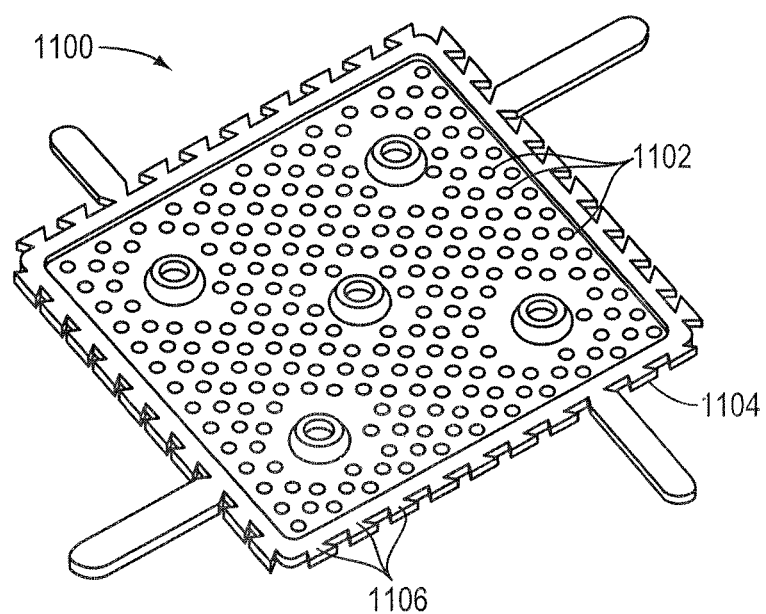
FIG. 11 is an alternative embodiment of an anode current collector and $CO_2$ removal element in accordance with the present invention.

FIG. 11 illustrates an alternative embodiment of the anode current collector 1100 that also acts to remove $CO_2$. The element 1100 has a plurality of small openings 1102 that allow $CO_2$ to collect adjacent to the component and then to pass through ports 1104 which lead to the ambient environment. It is noted that the larger openings 1106 in FIG. 11 are for fasteners that maintain compression within the fuel cell system. In the related application, a spring assembly is described in which such fasteners are not required and in such cases, the anode current collector would, illustratively, be of the type illustrated in FIG. 10.

The anode current collectors that also function as $CO_2$ management components of FIGS. 10 and 11 may also have one or more exhause management systems such as $CO_2$ exhaust channels and ports that are disposed in close proximity to the anode aspect of the membrane electrode assembly with which they are associated. Further in accordance with the invention, the exhaust channel/ports are sufficiently large to enable $CO_2$ to freely flow while substantially resisting back pressure into the vaporous fuel. In accordance with the invention, the $CO_2$ can be reheated to maintain any water in the exhaust in a vapor phase and release it as a vapor to avoid a buildup of condensation at the $CO_2$ exhaust port.

In accordance with another aspect of the invention, the exhaust management system 1001 of FIG. 10 includes an exhaust travel path 1006 that flows to the cold side of the enthalpy exchanger. The exhaust travel path 1006 has a catalyst 1008 disposed in at least a portion of the travel path, such as along the inner wall of a conduit, for example. Excess fuel is reacted at the catalyst to convert the excess fuel into water and carbon dioxide. The heat from the reaction and additional water generated in the reaction is then directed to the enthalpy exchanger to improve its efficiency and to improve water balance in the fuel cell system.

It should be appreciated that the present invention provides many advantages in the direct oxidation fuel cell system that has uniform fuel distribution from a single-point of fuel injection and a fuel feed rate that is not dependent upon the cell temperature. The fuel cell system has heat management and water management features that are incorporated directly within the fuel cell components and which use the waste heat of the fuel cell system to provide the heat needed for the fuel to vaporize. The vapor pressure of the fuel provides the pressure to uniformly distribute fuel to the MEA and avoids hot spots. The carbon dioxide release features further help to evenly distribute the fuel by keeping the $CO_2$ at ambient pressure, which is lower than the pressure of the vaporizing fuel. One element serves a number of functions within the fuel cell system thereby reducing the size and allowing for greater compression of fuel cell components thus leading to greater efficiencies in both manufacturing and operations of the fuel cell system.

The foregoing description has been directed to specific embodiments of the invention. It will be apparent, however, that other variations and modifications may be made to the described embodiments, with the attainment of some or all of the advantages of such. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A direct oxidation fuel cell system, comprising:
   a pair of membrane electrode assemblies, each said membrane electrode assembly having a polymer electrolyte membrane having a catalyst disposed on each of its major surfaces, and one or more diffusion layers, each of said membrane electrode assemblies having an anode aspect and a cathode aspect, with an anode current collector disposed generally adjacent to the anode aspect of each membrane electrode assembly;
   at least one fuel distribution assembly disposed such that the anode aspect of each membrane electrode assembly faces generally towards said fuel distribution assembly, said at least one fuel distribution assembly in thermal contact with at least one of a pair of enthalpy exchanger and heat spreader assemblies that provide heat to said at least one fuel distribution assembly, said at least one fuel distribution assembly having a fuel feed port configured to receive and inject liquid fuel to a flow field plate, said flow field plate having flow channels formed therein that split and spread from said fuel feed port to exit ports, the flow channels configured to convey the heat provided via the thermal contact to fuel passing therein to substantially convert the liquid fuel to a vapor within the flow channels, the exit ports configured to deliver the resulting vapor to each anode aspect to substantially uniformly distribute fuel across each anode aspect; and
   one or more methanol diffusion film layers;
   wherein the pair of enthalpy exchanger and heat spreader assemblies are each associated with one of the membrane electrode assemblies, and each include:
      a cold side element disposed adjacent to the cathode aspect of the membrane electrode assembly with which it is associated having a heat spreader plate to diffuse heat,
      a hot side element coupled to said cold side element into which air from the cathode is laterally introduced, said hot side element having additional flow channels through which the air passes, and
      an enthalpy exchange membrane located between the cold side element and the hot side element for transferring heat from the fuel cell to incoming air whereby warm, humid air transfers its heat and moisture to the incoming air in the cold side element which then flows to each cathode aspect of the membrane electrode assembly.

2. The direct oxidation fuel cell system as defined in claim 1 wherein said enthalpy exchanger and heat spreader assemblies act to remove heat from the cathode aspect and to provide at least a portion of a heat of vaporization required to vaporize said fuel.

3. The direct oxidation fuel cell system as defined in claim 1 wherein said enthalpy exchanger and heat spreader assemblies are integrated into a fuel cell stack.

4. The direct oxidation fuel cell system as defined in claim 1 wherein said enthalpy exchanger and heat spreader assemblies are disposed external to a fuel cell that contains the membrane electrode assemblies.

5. The direct oxidation fuel cell system as defined in claim 1 wherein said fuel distribution assembly includes at least one of:
   (i) a separate fuel feed for the anode aspect of each membrane electrode assembly;
   (ii) a common fuel feed that laterally introduces fuel to the flow channels;
   (iii) a vapor splitter element that distributes vapor methanol evenly over the membrane electrode assemblies; and
   (iv) a fuel feed vapor plenum having a nano-porous layer disposed as one wall of the plenum to adjust the flow of fuel to the anode aspect of the membrane electrode assembly.

6. The direct oxidation fuel cell system as defined in claim 1 further comprising one or more polyvinyliden fluoride (PVDF) layers disposed generally adjacent to said one or more methanol diffusion film layers.

7. The direct oxidation fuel cell system as defined in claim 1 further comprising a $CO_2$ exhaust management system that includes a $CO_2$ exhaust exit port allowing $CO_2$ exhaust to flow to an ambient environment such that $CO_2$ is at ambient pressure.

8. The direct oxidation fuel cell system as defined in claim 7 wherein said $CO_2$ exhaust is in thermal contact with an enthalpy exchanger and heat spreader assembly.

9. The direct oxidation fuel cell system as defined in claim 1 wherein said methanol diffusion film layers provide a barrier to bulk vapor transmission such that fuel is evenly distributed across the anode aspect of each membrane electrode assembly.

10. The direct oxidation fuel cell system as defined in claim 1 further comprising a heat switch coupled to one or more of said enthalpy exchanger and heat spreader assemblies, the heat switch when activated to direct heat in predetermined directions in the direct oxidation fuel cell system.

11. The direct oxidation fuel cell system as defined in claim 10 wherein heat of vaporization for said fuel is directed to said at least one fuel distribution assembly from said heat spreader plate of at least one of the enthalpy exchanger and heat spreader assemblies.

12. The direct oxidation fuel cell system as defined in claim 10 wherein heat is directed to at least one of said membrane electrode assemblies to maintain an even temperature at said membrane electrode assembly.

13. The direct oxidation fuel cell system as defined in claim 1 further comprising a heat switch coupled to said one or more enthalpy exchanger and heat spreader assemblies, the heat switch when activated to direct heat in predetermined directions in the fuel cell system.

14. The direct oxidation fuel cell system as defined in claim 13 wherein heat is directed to or from said one or more membrane electrode assemblies.

15. The direct oxidation fuel cell system as defined in claim 13 wherein heat is directed to said one or more membrane electrode assemblies.

* * * * *